June 2, 1959 W. S. DRUZ 2,889,455
PHASE-INVERTING AMPLIFYING CIRCUIT
Filed May 26, 1955
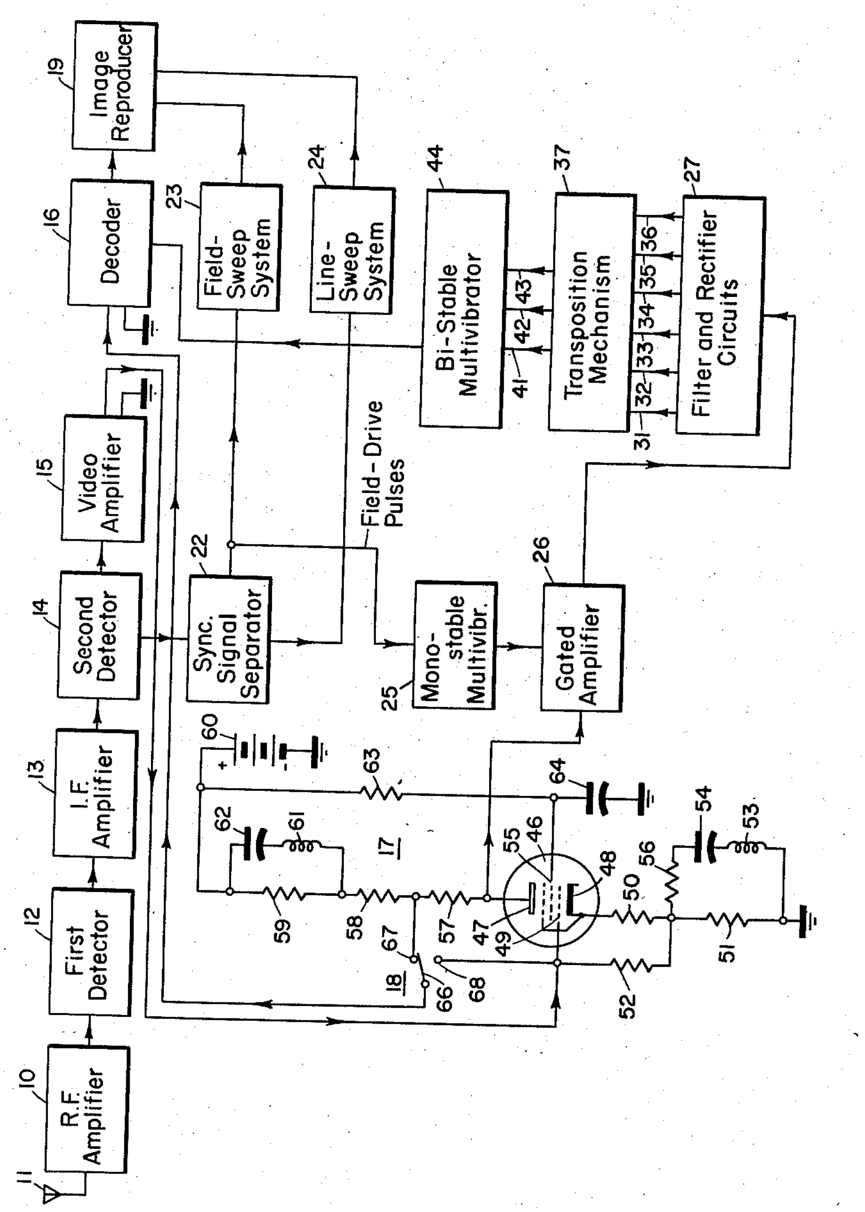
WALTER S. DRUZ
*INVENTOR.*
BY Francis W. Crotty
HIS ATTORNEY.

United States Patent Office 2,889,455

Patented June 2, 1959

2,889,455

PHASE-INVERTING AMPLIFYING CIRCUIT

Walter S. Druz, Bensenville, Ill., assignor to Zenith Radio Corporation, a corporation of Delaware Application May 26, 1955, Serial No. 511,225

2 Claims. (Cl. 250—27)

This invention relates to a novel phase-inverting amplifying circuit for simultaneously translating two signals, occupying different portions of the frequentcy spectrum, with a different degree of amplification. The circuit is particularly attractive when incorporated in a subscription television receiver and for that reason is described in such environment.

In numerous subscription television systems the television signal is coded in accordance with a selected code schedule at the transmitter, and a coding signal representing or indicative of that schedule is transmitted to subscriber receivers as a modulation component of the television signal itself. For example, in copending application Serial No. 326,107, filed December 15, 1952, and issued February 11, 1958 as Patent 2,823,252, in the name of Jack E. Bridges, and assigned to the present assignee, there is disclosed a system wherein the air-borne coding signal comprises combinations of signal bursts. The bursts individually have a predetermined identifying frequency and the combinations are transmitted to subscriber receivers along with the video signal, occurring during field-retrace intervals. The signal bursts are preferably randomly sequenced and randomly appearing within each combination and are derived from the video signal at the receiver by means of suitable filters. After separation from one another, they are available at the receiver for application to a transposition or switching mechanism just as they are applied to a like mechanism at the transmitter. This mechanism is employed in both locations to selectively establish particular circuit connections between input circuits, over which the bursts are conducted, and a plurality of output circuits which lead to a multi-stable actuating device such as a bi-stable multivibrator.

Accordingly, the bi-stable multivibrator is actuated in a prescribed sequence, shifting from one to the other of its stable operating conditions as dictated by the combinations of code signal bursts. The resulting amplitude changes in the output signal of the multivibrator are employed to effect mode changes in the television system by varying the relative timing of the video and synchronizing components. In this manner the operating mode is changed in an irregular or random fashion since the individual bursts appear at random within the combinations of signal bursts.

In addition to coding the telecast by altering the time relationship between the video and synchronizing signals, it may be desirable to invert the phase of the transmitted television signal so that white or light-colored objects appear black, and vice versa, in the image reproduced on television sets other than those of authorized subscribers. Actually, it has been found through experience that it is most desirable to have such flexibility so that the picture inversion may be added to the scrambling at will.

In order to correct or compensate the phase of the video signal during programs in which it has been inverted, a phase inverting stage must be interposed in the video channel of a subscription television receiver. However, it should have unity gain for video; otherwise, the video signal would have different amplitude levels for programs of inverted and conventional video polarity.

Usually, the received coding signal bursts are amplified to facilitate their use in decoding and it is highly desirable to be able to utilize a single amplifying stage as a unity gain video phase inverter, when necessary, and at the same time as a high gain amplifier for the coding signal bursts. The novel circuit of the present invention is especially suited to serve such dual functions.

Briefly, in accordance with a preferred embodiment of the invention, the television signal which includes the video and coding signals is applied to the control grid of a vacuum tube having a degenerative circuit coupled between its grid and cathode. In addition, a series-resonant inductance coil-condenser combination is shunted across part of the degenerative circuit. Since the coding signal bursts occupy a relatively narrow portion of the frequency spectrum compared with the video signal, the resonant circuit may be tuned to the mid-point of this narrow portion effectively to short out the degenerative circuit for such signal bursts. In this way, degeneration is primarily effective for the video signal in order to achieve unity gain for video. On the other hand, the degenerative circuit is rendered ineffective for the coding signal bursts and the gain of the stage is considerable as to them. An equalizing network in the form of another series-resonant inductance coil-condenser combination shunts a portion of the video load circuit and is tuned to the mid-point of the frequency range of the coding signal bursts to compensate the video signal for the effect of the frequency-selective shunt across the degenerative circuit.

It is, accordingly, an object of the present invention to provide a novel phase-inverting amplifying circuit for simultaneously translating two signals, each having a substantially different band width, with different degrees of amplification.

It is another object of the invention to provide a phase-inverting amplifying circuit for establishing one amplification ratio for a first signal lying in a relatively narrow portion of the frequency spectrum and another, substantially uniform amplification ratio for a wide-band second signal overlapping the narrow band of the first signal.

It is a more specific object of the invention to provide a phase-inverting amplifier for use in a subscription television receiver which phase inverts a video signal, if desired, with substantially no amplification while, during field-retrace intervals, amplifies to a considerable degree an applied coding signal.

The features of the invention which are believed to be new are set forth with particularity in the appended claims. The invention, together with further objects and advantages thereof, may best be understood, however, by reference to the following description in conjunction with the accompanying drawing, the single figure of which is a schematic diagram of a subscription television receiver including a phase-inverting amplifying circuit constructed in accordance with the invention.

The receiver, which may utilize a telecast originating at a transmitter constructed in accordance with the aforementioned disclosure by Bridges, comprises a radio-frequency amplifier 10 having input terminals connected to an antenna circuit 11 and output terminals connected to a first detector 12. This detector is coupled through an intermediate-frequency amplifier 13 to a second detector 14 which, in turn, is connected to the input circuit of a video amplifier 15. The output circuit of the video amplifier is coupled to a decoder 16 either directly or through a phase inverter 17, discussed in detail later, depending on the position of a manually-operated single-pole double-throw toggle switch 18. The position in which the subscriber places this switch is determined by the video polarity of the particular program to be viewed. The output terminals of decoder 16 are connected to the input electrodes of a cathode-ray image-reproducing device 19.

Decoder 16 may be similar to that disclosed and claimed in copending application Serial No. 243,039, filed August 22, 1951, and issued August 7, 1956, as Patent 2,758,153, in the name of Robert Adler, and assigned to the present assignee. It may comprise a beam-deflection tube having a pair of output circuits which may be selectively coupled into the video channel as the electron beam thereof is deflected from one to the other of two segmental anodes in synchronism with mode changes of the transmitted signal. It is assumed, of course, that these mode changes take the form of variations in the timing of the video signal relative to the synchronizing signal of the received composite television signal. Consequently, the output circuit coupled to one anode segment includes a time-delay network while the output connected to the other anode segment does not and the timing variations are compensated, effectively to decode the television signal, as the beam of the deflection tube is switched between its anodes. This switching effect is accomplished by means of a beam-deflection control or actuating signal applied to decoder 16, as explained hereinafter.

Second detector 14 is also coupled to a synchronizing-signal separator 22 which is coupled, in turn, to a field-sweep system 23 and to a line-sweep system 24. The output terminals of sweep systems 23 and 24 are connected respectively to field- and line-deflection elements (not shown) associated with image reproducer 19.

In an illustrated embodiment of the Bridges system, the air-borne coding signal may comprise six bursts of various signal frequencies individually transmitted between the line-drive pulses superimposed on the vertical blanking pulse after the post-equalizing pulses. To facilitate separating these signal bursts, it is desirable to provide circuitry which gates in only that portion of the composite television signal containing such bursts. To that end, field-drive pulses are derived from synchronizing-signal separator 22 and supplied to a mono-stable multivibrator 25 having output terminals connected to one input circuit of a normally-closed gated amplifier 26. The output circuit of video amplifier 15 is also coupled through phase-inverting amplifying circuit 17 to another input circuit of gated amplifier 26 to supply the composite television signal thereto, and the output circuit of gate 26 is coupled to each one of a series of filter and rectifier circuits, schematically shown as one unit 27. Since the aforementioned Bridges application discloses a system wherein the coding information received during each field-retrace interval includes signal bursts of six possible frequencies, unit 27 comprises six filter and rectifier circuits.

The output circuit of each of the filter-rectifier networks is connected over a respective one of a series of conductors 31–36 to a transposition or switching mechanism 37. As far as the technique of coding is concerned, the transposition mechanism is provided merely for the purpose of selectively connecting any one of conductors 31—36 to any one of three output conductors 41—43. Decoding can be accomplished only if the various interconnections established by switching mechanism 37 are identical to the corresponding interconnections established by a similar transposition mechanism interposed between a source of burst signals and a bi-stable multivibrator in the coding apparatus at the transmitter. The necessary information for setting the transposition mechanism is disseminated only to authorized subscribers and a suitable charge may, of course, be assessed for such information.

Output conductors 41–43 from the transposition mechanism are connected respectively to different input circuits of a similar bi-stable multivibrator 44 comprising two cross-coupled triodes. One preferred arrangement is to connect one of conductors 41–43 to the control grid of one of the triodes so that multivibrator 44 will be actuated to one of its two operating conditions in response to pulses applied over that conductor, to connect another of the conductors to the control grid of the other triode to actuate the multivibrator to the other of its operating conditions in response to pulses applied over that conductor, and to connect the third of the conductors to the control grid of each triode so that the multibivrator is actuated from its instantaneous condition to its alternate condition in response to applied pulses over that third conductor. The output terminals of bi-stable multivibrator 44 are connected to the deflection-control elements of decoder 16 to provide an actuating or deflection-control signal therefor which has an amplitude excursion each time the multivibrator changes from one operating condition to the next.

In accordance with the present invention, phase-inverting amplifier 17, which serves the dual function of inverting the phase of the video, when necessary, with unity gain and also of translating the air-borne coding signal bursts with considerable amplification, comprises an electron-discharge device 46 having an anode 47, cathode 48, screen grid 55, and control grid 49. The television signal is impressed on control grid 49 and it will be recalled that this signal, which is coded in accordance with a predetermined code schedule, includes video components occupying a relatively wide portion of the frequency spectrum and occurring during field-trace intervals. It further includes coding signal bursts representing the code schedule and occurring during intervening field-retrace intervals. The code signal bursts occupy a relatively narrow portion of the frequency spectrum which is completely over-lapped by wide-band video components. The coding signal bursts are generally a downward modulation of the video carrier relative to black level and are within the same amplitude range of the carrier as the video components. A degenerative circuit is inserted between the control grid and cathode of tube 46 and includes a resistor 50 and a resistor 51 connected in series between cathode 48 and a point of reference potential or ground. Control grid 49 is connected to the injunction between resistors 50 and 51 through a grid-leak return resistor 52. Resistor 51 is connected in the grid-cathode circuit of tube 46 via the ground connection and the output circuitry of video amplifier 15 in order to realize degeneration. A frequency-selective circuit, consisting of an inductance coil 53 and a condenser 54 in series with a resistor 56, is bridged across resistor 51 to shunt that part of the degenerative cathode circuit.

The air-borne signal bursts comprising the coding signal are preferably within the 550 to 880 kilocycle range and the frequency-selective circuit is tuned to the mid frequency of that band. Consequently, it has an impedance within that relatively narrow portion of the spectrum which is extremely low compared to the resistance of the shunted part of the degenerative circuit. Resistor 56 preferably has a relatively small value in order to effect broad tuning over the entire range from 550 to 880 kilocycles. With this arrangement, the degenerative circuit is predominantly effective with respect to the video signal and is considerably less effective with respect to the coding signal bursts. In fact, if the circuit parameters are adjusted properly, pentode 46 may be made to saturate, during the occurrence of the coding signal, in response to any unwanted extraneous signals having amplitudes greater than the positive peak of the coding signal, and may be made to cut off in response to signals that are negative with respect to the negative peaks of the coding signal bursts.

Anode 47 is coupled through series-connected resistors 57, 58 and 59 to the positive terminal of a source of unidirectional potential 60, the negative terminal of which is connected to ground. Resistor 57 preferably has a very high resistance compared to that of resistors 58 and/or 59 for reasons which will become apparent. An equalizing network, including an inductance coil 61 in series with a condenser 62, shunts resistor 59. This network is tuned to the same point as circuit 53, 54, 56 and presents at the code signal burst frequencies an impedance which is low compared to the resistance of resistor 59. This equalizing network compensates the effect of the frequency-selective circuit in the cathode circuit to the translation of the video signal to achieve a substantially uniform frequency response to all the components of the video signal. Screen grid 55 is connected to the positive terminal of source 60 through a resistor 63 and is coupled to ground through a by-pass condenser 64.

The movable blade 66 of toggle switch 18 is connected to the input circuit of decoder 16 to selectively establish a connection from either of two stationary contacts 67, 68. Contact 67 is connected to the junction of resistors 57 and 58 and contact 68 is connected to grid 49. When it is desired to effect a phase inversion of the video signal at the receiver, switch 18 is positioned to engage contact 67 as shown to derive the video signal from the video load circuit of amplifier 17. The circuit parameters of amplifier 17 are so selected that contact 67 is connected to the point along the load circuit at which a signal of unity gain is derived, namely, a point at which the video signal has substantially the same amplitude as, but inverted phase to, the input video signal. When no phase inversion is desired, switch blade 66 engages contact 68 which removes the phase inverter from the video channel.

Inasmuch as a complete description of the coding technique is included in the copending Bridges application and since the coding technique itself forms no part of the present invention, the operation of the complete receiver will be described only briefly, disregarding for the moment the detailed operation of phase-inverting amplifier 17. The coded television signal is intercepted by antenna 11, amplified in radio-frequency amplifier 10, heterodyned to the selected intermediate frequency in first detector 12, amplified in intermediate-frequency amplifier 13 and detected in second detector 14 to produce the coded composite video signal. This signal is amplified in video amplifier 15, translated to decoder 16 either directly or through phase inverter 17 depending on the position of switch 18, and impressed on the input electrodes of image-reproducing device 19 to control the intensity of the electron beam of the device in a well-known manner.

The synchronizing components are separated in separator 22, the field-synchronizing pulses being utilized to synchronize the operation of sweep system 23 and consequently the vertical-deflection signal supplied to the field-deflection elements of reproducer 19, whereas the line-synchronizing pulses are utilized to synchronize sweep system 24 and therefore the horizontal-deflection signal supplied to the horizontal-deflection elements in the image reproducer. Of course, the sound-modulated carrier wave normally received along with the video carrier is detected and reproduced in an appropriate audio system which has been omitted from the drawing for purposes of simplicity.

Field-drive pulses from separator 22 are supplied to mono-stable multivibrator 25 to produce a gating pulse for normally-closed gated amplifier 26. The parameters of the multivibrator are so chosen as to overlap, in point of time, that portion of the field-retrace interval of the composite video signal which includes the signal bursts constituting the coding signal. The composite video signal from amplifier 15 is continuously applied, through phase-inverter amplifier 17, to the input circuit of amplifier 26, but only the information contained during the interval of the gating pulse is translated to filter and rectifier unit 27. Amplifier 26 is thus "open" during the times the signal bursts of various frequencies, representing the coding schedule of the program, are received and since the filter and rectifier circuits are individually tuned to an assigned one of these frequencies, such bursts are separated out from the composite video signal and from each other. Each time a burst of signal frequency occurs in the coding signal, it is channeled over a corresponding input circuit 31–36 through transposition mechanism 37 to a selected one of the input circuits 41–43 of bi-stable multivibrator 44. The coding apparatus at the transmitter comprises an identical arrangement of a bi-stable multivibrator connecter to a source of air code signal bursts through a transposition mechanism so if the transposition mechanism of the receiver is adjusted to the same setting as the transportation mechanism at the transmitter, the input circuits of bi-stable actuating device 44 receive pulses similar to those received by the input circuits of the corresponding bi-stable actuating device at the transmitter. Multivibrator 44 therefore produces a rectangularly-shaped actuating or deflection-control signal for decoder 16 which is identical in wave form but opposite in phase to that developed at the transmitter for coding the television signal initially. It undergoes an amplitude excursion each time the multivibrator is triggered from one of its operating conditions to the other. Decoder 16 consequently operates in synchronism with the coder at the transmitter so that the signal applied to the input circuit of image reproducing device 19 is suitably compensated to effect intelligible reproduction.

Assume that the polarity of the received video signal for a particular program requires a video inversion for proper decoding. The subscriber is advised of this requirement before program time and operates switch 18 to the position shown so that circuit 17 functions as a phase inverter with unity gain with respect to video. The gain condition is established primarily because of the effect of the degenerative circuit comprising resistors 50 and 51.

Unity gain is not desired, however, for the air-borne coding signal bursts since maximum amplitude and preferably limiting of those bursts is required. Accordingly, series-resonant circuit 53, 54 is tuned to short out degenerative resistor 51 at the frequencies of these bursts. With decreased degeneration, the amplification or gain is increased and limiting of the air code signal bursts occurs in tube 46 under all but very weak signal conditions. The coding signal is derived from a different portion of the anode load circuit than the video signal; specifically, the load circuit for the coding signal includes resistor 57 which is of relatively high value.

In view of the fact that the video signal has a frequency range from 0 to 4.5 megacycles, some components necessarily fall within the narrow range for which the amplifier has increased gain. Unless compensated, this would result in a non-uniform frequency response characteristic, and, consequently the equalizing network 61, 62 shunts part of the video load circuit, namely resistor 59. Thus, a substantially uniform frequency response is realized in respect of the video signal.

While the invention is not limited to any specific constants or components, the following electrical dimensions of the embodiment shown are illustrative of a proven phase-inverting amplifying circuit:

| | | |
|---|---|---|
| Pentode 46 | | Type 6AU8 |
| Resistor 50 | ohms | 120 |
| Resistor 51 | do | 220 |

| | | |
|---|---|---|
| Resistor **52** | megohms | 1 |
| Resistor **56** | ohms | 82 |
| Resistor **57** | do | 4.7K |
| Resistor **58** | do | 150 |
| Resistor **59** | do | 390 |
| Resistor **63** | do | 150K |
| Condenser **54** | micro-micro-farads | 820 |
| Condenser **62** | do | 820 |
| Condenser **64** | micro-farads | 20 |
| Coil **53** | micro-henries | 58 |
| Coil **61** | do | 58 |
| Potential of source **60** | volts | 250 |

The invention therefore provides a phase-inverting amplifying circuit which amplifies to a considerable extent the air-borne coding signal bursts, having components occupying a relatively narrow portion of the frequency spectrum, and amplifies to a negligible extent the video signal, which has components occupying a relatively wide portion of the frequency spectrum encompassing the aforesaid narrow portion, while at the same time providing uniform frequency response for the video signal.

Certain features described in the present application are disclosed and claimed in copending application Serial No. 700,855, filed December 5, 1957, in the name of Jacob M. Sacks, also assigned to the present assignee.

While a particular embodiment of the invention has been shown and described, modifications may be made, and it is intended in the appended claims to cover all such modifications as may fall within the true spirit and scope of the invention.

I claim:

1. In a phase-inverting amplifying circuit including an electron-discharge device having an anode, a cathode and a control grid upon which grid is impressed a composite signal containing a narrow band signal occupying a relatively narrow frequency range and a wide band signal occupying a relatively wide frequency range overlapping at least part of said narrow range, and further including frequency-selective degenerative means coupled between said control grid and said cathode and predominantly effective with respect to the components of said wide band signal exhibiting frequencies outside of said narrow frequency range to provide higher gain for said narrow band signal than for said wide band signal, the improvement comprising: a load circuit including a plurality of series-connected impedance elements coupled to said anode; means for deriving said wide band signal from one portion of said load circuit including a predetermined pair of said impedance elements; means for deriving said narrow band signal from a different portion of said load circuit; and frequency-selective equalizing means for selectively reducing the effective impedance of only one of said impedance elements to the components of said wide band signal having frequencies within said narrow frequency range relative to its impedance to the remaining components of said wide band signal to compensate the effect of said frequency-selective degenerative means on the translation of the components of said wide band signal exhibiting frequencies within said narrow range, to provide a substantially uniform frequency response to all of the components of said wide band signal.

2. In a phase-inverting amplifying circuit including an electron-discharge device having an anode, a cathode and a control grid upon which grid is impressed a composite signal containing a narrow band signal having components occupying a relatively narrow frequency range and a wide band signal having components occupying a relatively wide frequency range overlapping at least part of said narrow range, and further including a frequency-selective degenerative means coupled between said control grid and said cathode and also to a point of reference potential and predominantly effective with respect to the components of said wide band signal exhibiting frequencies outside of said narrow frequency range to provide higher gain for said narrow band signal than for said wide band signal, the improvement comprising: a load circuit including a load resistor coupled between said anode and said point of reference potential; means for deriving said wide band signal from a take-off point along said resistor; means for deriving said narrow band signal from said anode; and an equalizing network, including a series-resonant inductance coil and condenser combination tuned to a frequency within said narrow range, shunting at least part of said load resistor between said take-off point and said point of reference potential and having an impedance, within said narrow frequency range, which is low compared to the resistance of the shunted part of said load resistor to compensate the effect of said frequency-selective degenerative means on the translation of the components of said wide band signal within said narrow range for achieving a substantially uniform frequency response to all of the components of said wide band signal.

References Cited in the file of this patent

UNITED STATES PATENTS

| | | |
|---|---|---|
| 2,255,839 | Wilson | Sept. 16, 1941 |
| 2,293,262 | Koch | Aug. 18, 1942 |
| 2,351,934 | De Kramolin | June 20, 1944 |
| 2,724,050 | Boscia | Nov. 15, 1955 |
| 2,735,002 | Keizer et al. | Feb. 14, 1956 |
| 2,797,258 | Denton | June 25, 1957 |